US011651328B2

(12) United States Patent
DeLuca et al.

(10) Patent No.: US 11,651,328 B2
(45) Date of Patent: May 16, 2023

(54) DELIVERY VERIFICATION

(71) Applicant: INTERNATIONAL BUSINESS MACHINES CORPORATION, Armonk, NY (US)

(72) Inventors: Lisa Seacat DeLuca, Baltimore, MD (US); Jeremy R. Fox, Georgetown, TX (US); Zachary A. Silverstein, Jacksonville, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 16/996,940

(22) Filed: Aug. 19, 2020

(65) Prior Publication Data
US 2022/0058576 A1 Feb. 24, 2022

(51) Int. Cl.
G06Q 10/083 (2023.01)
H04W 4/029 (2018.01)
(Continued)

(52) U.S. Cl.
CPC ....... *G06Q 10/0838* (2013.01); *G06Q 10/083* (2013.01); *H04B 17/318* (2015.01);
(Continued)

(58) Field of Classification Search
CPC .. G06Q 10/0838; G06Q 10/083; G06Q 50/28; H04B 17/318; H04W 4/029; G16Y 10/40
(Continued)

(56) References Cited

U.S. PATENT DOCUMENTS 1,006,400 A 10/1911 Pavia
9,985,839 B2 5/2018 Skaaksrud
(Continued)

FOREIGN PATENT DOCUMENTS

JP 2018506121 A 3/2018
WO 2015042017 A1 3/2015

OTHER PUBLICATIONS

"Crowdsourced Delivery for Last-Mile Distribution: An Agent-Based Modelling and Simulation Approach" Published by IEEE (Year: 2017).*
(Continued)

*Primary Examiner* — Zeina Elchanti
(74) *Attorney, Agent, or Firm* — Rakesh Roy

(57) ABSTRACT

A method, computer system, and a computer program product for delivery verification is provided. The present invention may include receiving a request to deliver a package to a delivery location associated with a user profile, wherein the user profile includes a first network information for verifying the delivery location. The present invention may include transmitting the user profile associated with the delivery location to a courier device, wherein the courier device is associated with a courier agent delivering the package to the delivery location. The present invention may include detecting, using the courier device, the first network information at the delivery location. The present invention may include receiving a second network information captured by the courier device at the delivery location. The present invention may include learning the received second network information for verifying the delivery location, wherein the learned second network information is stored with the user profile.

16 Claims, 9 Drawing Sheets

(51) Int. Cl.
*H04B 17/318* (2015.01)
*G16Y 10/40* (2020.01)
*G06Q 50/28* (2012.01)

(52) U.S. Cl.
CPC ............ *H04W 4/029* (2018.02); *G06Q 50/28* (2013.01); *G16Y 10/40* (2020.01)

(58) Field of Classification Search
USPC ........................................................ 705/330
See application file for complete search history.

(56) References Cited

U.S. PATENT DOCUMENTS

| | | |
|---|---|---|
| 10,064,001 B1 | 8/2018 | Butler |
| 10,419,442 B2 | 9/2019 | Poli |
| 11,126,952 B1 * | 9/2021 | Son ....................... H04W 4/029 |
| 11,301,799 B1 * | 4/2022 | Coutand ............ G06Q 10/0833 |
| 11,348,058 B1 * | 5/2022 | Wang ....................... G06F 16/29 |
| 2015/0081583 A1 * | 3/2015 | Butler .................... H04W 4/025 705/333 |
| 2016/0048796 A1 * | 2/2016 | Todasco ................ H04W 12/06 705/330 |
| 2016/0292635 A1 * | 10/2016 | Todasco ................ H04W 4/023 |
| 2017/0228690 A1 | 8/2017 | Kohli |
| 2017/0344998 A1 | 11/2017 | Kohli |
| 2020/0012998 A1 * | 1/2020 | Gillen .................. G06Q 10/083 |
| 2020/0371246 A1 * | 11/2020 | Marmet ................ G01S 5/0009 |

OTHER PUBLICATIONS

Mell et al., "The NIST Definition of Cloud Computing", National Institute of Standards and Technology, Special Publication 800-145, Sep. 2011, 7 pages.

\* cited by examiner

DELIVERY VERIFICATION

BACKGROUND

The present invention relates generally to the field of computing, and more particularly to locating technology.

Electronic commerce (E-commerce) has led to an increased demand for package delivery services. Even with the assistance of Global Positioning System (GPS) technology, thousands of packages go misdelivered every year. Misdelivered packages may get lost during transit or may be dropped off at the wrong address near the final destination. In some instances, the address on a house may be missing or obscured, the address in the GPS may be incorrect, or the ordering of addresses in the neighborhood may not be intuitive, resulting in delivery error.

SUMMARY

Embodiments of the present invention disclose a method, computer system, and a computer program product for delivery verification. The present invention may include receiving a request to deliver a package to a delivery location associated with a user profile, wherein the user profile includes a first network information for verifying the delivery location. The present invention may include transmitting the user profile associated with the delivery location to a courier device, wherein the courier device is associated with a courier agent delivering the package to the delivery location. The present invention may include detecting, using the courier device, the first network information at the delivery location. The present invention may include receiving a second network information captured by the courier device at the delivery location. The present invention may include learning the received second network information for verifying the delivery location, wherein the learned second network information is stored with the user profile.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
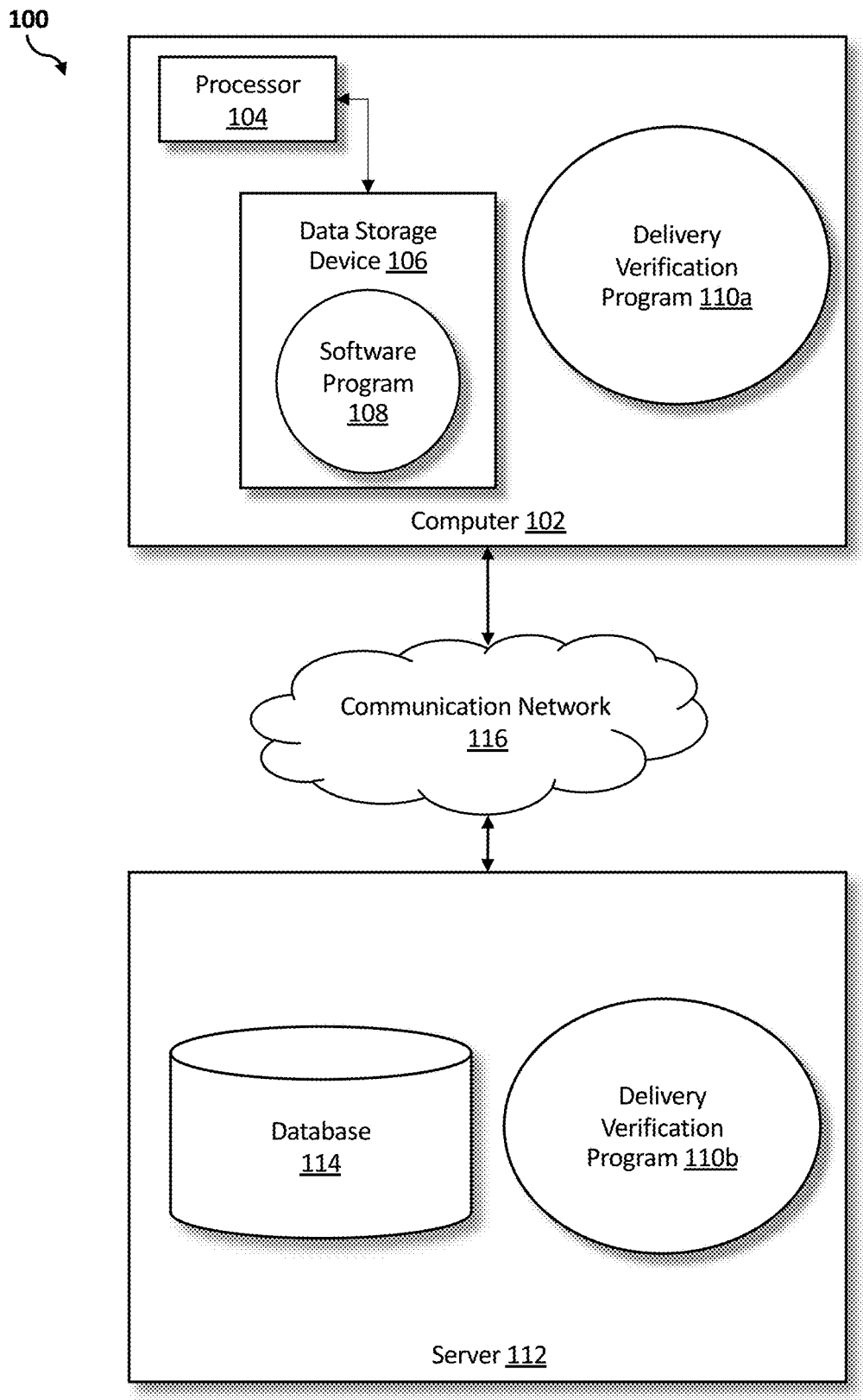
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for verifying a delivery. As such, the present embodiment has the capacity to improve the technical field of location and delivery technology by verifying a physical delivery address based on matching wireless signals broadcasted within a proximity of the physical delivery address. More specifically, a request to deliver a package to a delivery address may be received. Then, a profile associated with the delivery address may be identified. The profile may include at least one network name being broadcasted by a device at the delivery address. Next, network names and signal strengths associated with the network names may be retrieved at a first location. Thereafter, the profile may be compared to the retrieved network names and signal strengths to provide an assessment of the first location as being the delivery address.

As described previously, e-commerce has led to an increased demand for package delivery services. Even with the assistance of GPS technology, thousands of packages go misdelivered every year. Misdelivered packages may get lost during transit or may be dropped off at the wrong address near the final destination. In some instances, the address on a house may be missing or obscured, the address in the GPS may be incorrect, or the ordering of addresses in the neighborhood may not be intuitive, resulting in delivery error.

Therefore, it may be advantageous, to among other things, provide a way to associate a delivery address with one or more Internet of Things (IoT) networked devices in proximity of the delivery address. It may also be advantageous to validate the delivery address by detecting a signal strength and broadcasted network name of the IoT devices associated with the delivery address.

According to one embodiment, a user and a courier service may opt-in to implement a delivery verification program. The user may generate a profile associated with a user address for delivery verification. The user profile may include information, such as, the user address, Wi-fi and other network signals associated with the user address, and the corresponding names of those Wi-fi and other network signals. In one embodiment, the user profile may be saved in a delivery verification data store. In some embodiments, the delivery verification program may attach the user's purchases for delivery to the user profile. When an agent of the courier service begins delivering the user's package, the delivery verification program may transmit the user profile to an agent device of the courier service. In one embodiment, the transmitted user profile may include information regarding the user's package for delivery as well as known and expected networks at the user address. Then, in one embodiment, as the agent approaches the vicinity of the user address, the agent may use the agent device to mark the user package as delivered. In response, the agent device may capture the networks and network strengths present at the user address at the delivery time and transmit this captured information back to the delivery verification data store. In some embodiments, the delivery verification program may implement a blockchain for writing the gathered network information in a trusted immutable data store and storing a conformation of the network being found and matching the user profile.

According to one embodiment, another package may be delivered to the user address in the future via the courier service. In such instances, the delivery verification program may process the user address when the agent of the courier service marks the package as delivered. In one embodiment, the delivery verification program may determine if the present networks and signal strength match the historical data stored in the delivery verification data store. If there is a match, the delivery verification store may receive feedback indicating that the present networks are still there, and the historical data is still valid. If there is no match, the delivery verification program may prompt the agent of the courier service to validate the user address for delivery. In one embodiment, the agent may manually verify that they are at the correct address. If the address is correct, the agent may transmit the present network information to update the delivery verification store. Based on the agent's validation, the delivery verification program may learn the updated network information associated with the delivery address.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a delivery verification program 110a. The networked computer environment 100 may also include a server 112 that is enabled to run a delivery verification program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the delivery verification program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the delivery program 110a, 110b (respectively) to validate a delivery location by detecting a signal strength and broadcasted network name of IoT devices associated with the delivery location. The delivery verification method and system are explained in more detail below with respect to FIGS. 2 to 6.

Figure 2:
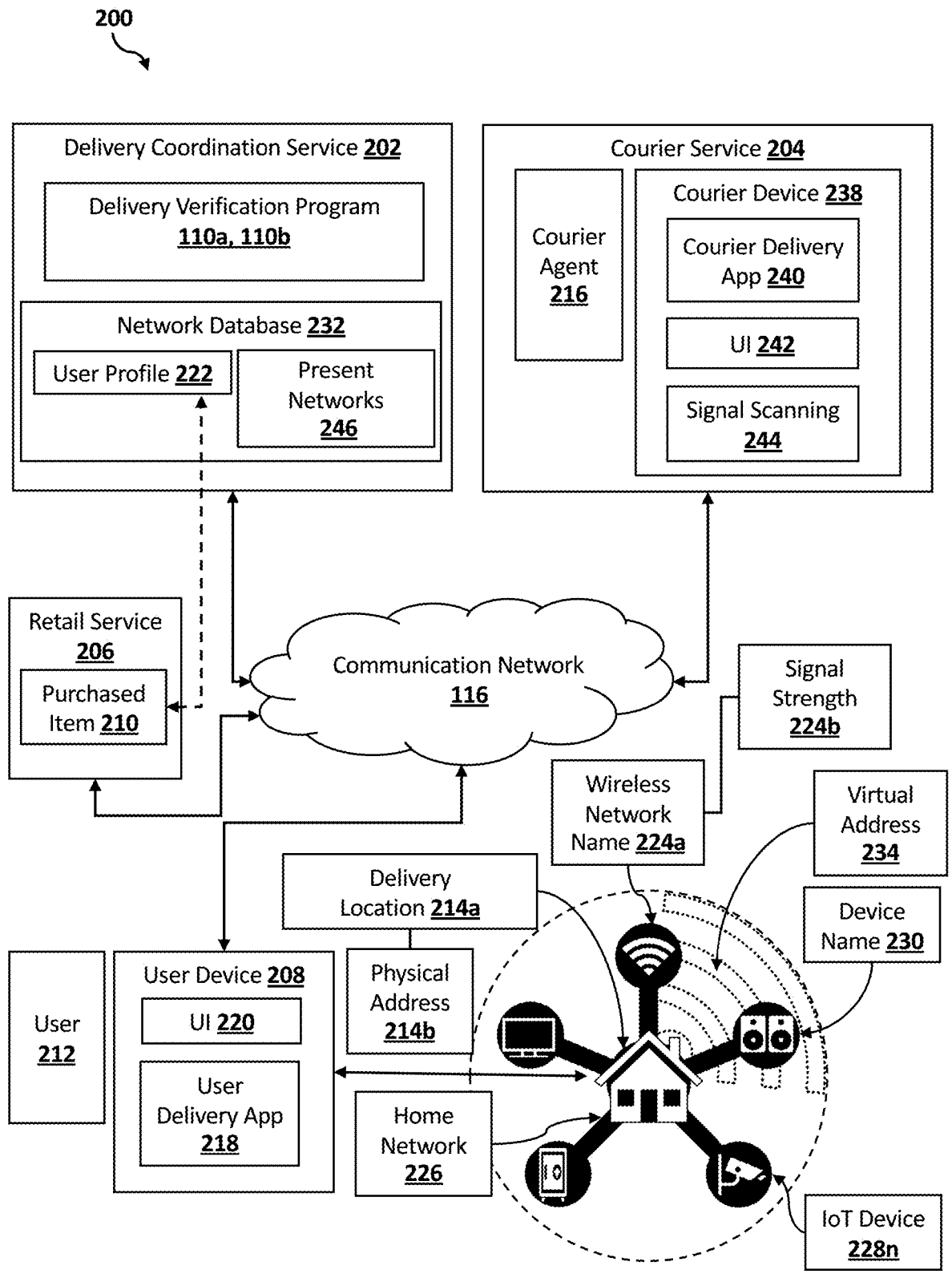
FIG. 2 is a schematic block diagram of a networked computer environment implementing a delivery verification program according to at least one embodiment.

Referring now to FIG. 2, a schematic block diagram of a networked computer environment 200 implementing the delivery verification program 110a, 110b according to at least one embodiment is depicted. Environment 200 includes a delivery coordination service 202, a courier service 204, a retail service 206, and a user device 208, all interconnected over communication network 116 (as described in FIG. 1) which may include any combination of connections and protocols to support the communication between components of environment 200.

According to one embodiment, the delivery coordination service 202, the courier service 204, and the retail service 206 may comprise any computer system (e.g., client computer(s) 102 and/or server computer(s) 112) known in the art, such as, for example, a desktop computer, a laptop computer, a tablet computer, a netbook computer, a personal computer, or a specialized computer server. In some embodiments, the delivery coordination service 202, the courier service 204, and the retail service 206 may include computer systems utilizing cluster computers and components that act as a single pool of seamless resources when accessed through communication network 116. In embodiments, the user device 208 may comprise a mobile device, a kiosk, a car dashboard, a voice response unit, or any other form factor of client computer 102.

According to one embodiment, the delivery coordination service 202 may include a computer system having a tangible storage device that is enabled to run the delivery verification program 110a, 110b. In one embodiment, the delivery verification program 110a, 110b may include a single computer program or multiple program modules or sets of instructions being executed by the processor of the computer system of the delivery coordination service 202. The delivery verification program 110a, 110b may include routines, objects, components, units, logic, data structures, and actions that may perform particular tasks or implement particular abstract data types. The delivery verification program 110a, 110b may be practiced in distributed cloud computing environments where tasks are performed by remote processing devices that may be linked through communication network 116. In one embodiment, the delivery verification program 110a, 110b may include program instructions that may be collectively stored on one or more computer-readable storage media.

According to one embodiment, a user 212 may opt-in to the delivery coordination service 202, e.g., via user device 208, to ensure that the courier service 204 provides accurate deliveries to a delivery location 214a associated with the user 212. In some embodiments, the courier service 204 may opt-in to the delivery coordination service 202 to enable a courier agent 216 (e.g., delivery person) of the courier service 204 to provide accurate deliveries to the delivery location 214a associated with the user 212.

In one embodiment, the delivery verification program 110a, 110b may include a user delivery application 218 which may be enabled to run on the user device 208 as a frontend application (e.g., web application). The user device 208 may include a user interface (UI) 220. According to one embodiment, the UI 220 may include a web interface or a graphical user interface (GUI) configured to display (e.g., output) graphical or textual data from the user delivery application 218 running on the user device 208. In one embodiment, the UI 220 may also provide an input device to enable the user 212 to interact with the user delivery application 218 (e.g., by entering text or voice input or by selecting user options) running on the user device 208.

According to one embodiment, the delivery verification program 110a, 110b may enable the user 212 to generate a user profile 222 for delivery verification purposes. In one embodiment, the user 212 may set up the user profile 222 within the user delivery application 218 running on the user device 208. In some embodiments, the user 212 may set up (e.g., via user device 208) the user profile 222 within a profile settings portal of individual retail services 206. In other embodiments, the user 212 may set up (e.g., via user device 208) the user profile 222 within a profile settings portal of individual courier services 204.

According to one embodiment, in generating the user profile 222, the delivery verification program 110a, 110b may prompt the user 212 (e.g., via user device 208) to enter a physical address 214b of the delivery location 214a associated with the user 212. In one embodiment, the delivery verification program 110a, 110b may also prompt the user 212 to enter a wireless network name 224a in the user profile 222. The wireless network name 224a may correspond to a home network 226, e.g., local area network (LAN), running in the delivery location 214a. In one embodiment, the wireless network name 224a may correspond to a Wi-Fi signal broadcasting in the home network 226. In various embodiments, the delivery verification program 110a, 110b may prompt the user 212 to generate a guest wireless network (e.g., with restricted access) for sharing in the user profile 222. In one embodiment, the delivery verification program 110a, 110b may prompt the user 212 to share a password for the guest wireless network for connection confirmation purposes as will be discussed later in this disclosure. In some embodiments, the user 212 may also have the option to provide a wireless network name of a neighboring facility (e.g., neighbor's house adjacent the delivery location 214a) for additional verification of the delivery location 214a. In some embodiments, the user delivery application 218 running on the user device 208 may automatically detect the Wi-Fi signal broadcasting in the home network 226 and write the wireless network name 224a to the user profile 222. In various embodiments, the user delivery application 218 running on the user device 208 may also determine a signal strength 224b of the Wi-Fi signal (e.g., having the wireless network name 224a) at the delivery location 214a. In embodiments, the delivery verification program 110a, 110b may store the signal strength 224b with the wireless network name 224a in the user profile 222.

According to at least one embodiment, the delivery location 214a may include one or more internet connected devices, e.g., IoT devices 228n connected to the home network 226. IoT device 228n may include, without limitations, a smart television, smart speakers, smart lock, and other home security devices (e.g., security camera). In one embodiment, IoT devices 228n may broadcast a detectable radio signal within a proximity of the delivery location 214a. IoT devices 228n may be enabled to use various communication protocols, such as, for example, Wi-Fi, Bluetooth® (Bluetooth and all Bluetooth-based trademarks and logos are trademarks or registered trademarks of Bluetooth SIG, Inc. and/or its affiliates), near field communication (NFC), and radio-frequency identification (RFID). In one embodiment, each IoT device 228n may include a unique identifier (UID) which may be broadcast as a device name 230. In various embodiments, the delivery verification program 110a, 110b may enable detecting the device name 230 of the IoT device 228n to provide further confirmation of the delivery location 214a.

According to one embodiment, in generating the user profile 222, the delivery verification program 110a, 110b may also prompt the user 212 (e.g., via user device 208) to enter the device names 230 of the IoT devices 228n running in the home network 226 of the delivery location 214a. In various embodiments, the delivery verification program 110a, 110b may implement the user device 208 to automatically scan the home network 226 for IoT devices 228n and write the corresponding device names 230 to the user profile 222.

According to one embodiment, the user profile 222 may be stored in a network database 232 of the delivery coordination service 202. As previously described, the user profile 222 may include the physical address 214b of the delivery location 214a, the wireless network name 224a, the signal strength 224b associated with the wireless network name 224a, and the device names 230 of any IoT devices 228n connected to the home network 226 of the delivery location 214a. In some embodiments, the delivery verification program 110a, 110b may utilize the information in the user profile 222 to generate a virtual address 234 corresponding to the physical address 214b of the delivery location 214a. In one embodiment, the virtual address 234 may be indicated by a signal radius (e.g., based on the signal strength 224b) of the wireless network name 224a. In some embodiments, a match between the virtual address 234 and the physical address 214b may indicate a confirmation of the delivery location 214a. In embodiments, the delivery verification program 110a, 110b may utilize the device names 230 of the IoT devices 228n as digital landmarks associated with the virtual address 234. In one embodiment, the delivery verification program 110a, 110b may use the correlation between the digital landmarks (e.g., device name 230 of the IoT device 228n) and the virtual address 234 (e.g., signal strength 224b) to derive further confirmation of the delivery location 214a.

According to one embodiment, the user 212 may interact with the retail service 206, e.g., via user device 208 over communication network 116, to purchase one or more items (e.g., purchased item 236). In one embodiment, the retail service 206 may communicate with the delivery coordination service 202 to link the purchased item 210 to the corresponding user profile 222. In one embodiment, the delivery verification program 110a, 110b may receive a request (e.g., from retail service 206 or user device 208) to deliver a package (e.g., including the purchased item 210) to the delivery location 214a of the user 212.

As described previously, the courier service 204 may opt-in to the delivery coordination service 202 to enable the courier agent 216 of the courier service 204 to provide accurate deliveries to the delivery location 214a associated with the user 212. Accordingly, the delivery verification program 110a, 110b may implement the courier service 204 to execute the delivery of the package (e.g., including the purchased item 210) to the delivery location 214a of the user 212.

In one embodiment, the courier service 204 may provide a courier device 238 for each courier agent 216, where the courier device 238 may enable the courier agent 216 to locate and validate the delivery location 214a for a package associated with the user 212. The courier device 238 may include, for example, a mobile device, a kiosk, a car dashboard, a voice response unit, or any other form factor of client computer 102. In one embodiment, the delivery verification program 110a, 110b may include a courier delivery application 240 which may be enabled to run on the courier device 238 as a frontend application (e.g., web application). In at least one embodiment, the courier device 238 may also include a UI 242 configured to display (e.g., output) graphical or textual data from the courier delivery application 240 running on the courier device 238. In one embodiment, the UI 242 may also provide an input device to enable the courier agent 216 to interact with the courier delivery application 240 (e.g., by entering text or voice input or by selecting user options) running on the courier device 238. In various embodiments, the courier device 238 may further include a signal scanning component 244 which may be configured to detect the wireless network name 224a, signal strength 224b, and the device names 230 of the IoT devices 228n in proximity of the delivery location 214a. In one embodiment, the signal scanning component 244 may comprise various communication components, such as, for example, a cellular component, a Wi-Fi component, a Bluetooth component, an NFC component, an RFID component, and any other suitable communication protocol.

According to one embodiment, the delivery coordination service 202 may transmit a request to the courier service 204 to deliver a package to the delivery location 214a of the user 212. In one embodiment, the delivery request may be generated by the courier delivery application 240 in the courier device 238. In one embodiment, the delivery verification program 110a, 110b may transmit the user profile 222 associated with the delivery request to the courier device 238. In one embodiment, the user profile 222 associated with the delivery location 214a may indicate one or more known or expected wireless networks at the delivery location 214a. More specifically, the user profile 222 transmitted to the courier device 238 may indicate the wireless network name 224a known or expected to be found at the delivery location 214a. In some embodiments, the courier device 238 may also receive indication of the known or expected signal strength 224b of the wireless network at the delivery location 214a. In at least one embodiment, the courier device 238 may also receive indication of the known or expected device names 230 of the IoT devices 228n at the delivery location 214a.

According to one embodiment, when the courier agent 216 arrives in a vicinity of the delivery location 214a, the courier agent 216 may interact with the courier device 238 to mark the package as delivered. In one embodiment, the package may include a machine-readable identifier, such as, for example, a QR Code® (QR Code and all QR Code-based trademarks and logos are trademarks or registered trademarks of Denso Wave Inc. and/or its affiliates), a universal product code (UPC), or any other suitable barcode. In one embodiment, marking the package as delivered (e.g., scanning a package identifier using courier device 238) may trigger a delivery event by the courier device 238. In response to the delivery event, the courier device 238 may automatically capture or retrieve one or more network information that may be detectable in proximity of the delivery location 214a at the delivery time. In one embodiment, the courier device 238 may automatically capture the wireless network name 224a, the signal strength 224b, and the device names 230 of any IoT devices 228n at the delivery location 214a. According to one embodiment, the delivery verification program 110a, 110b may retrieve the captured present network information from the courier device 238 and may log the captured present network information in the network database 232 as present networks 246. According to one embodiment, the delivery verification program 110a, 110b may compare the network information associated with the user profile 222 with the present networks 246 to generate an assessment of whether a location of the courier agent 216 matches the delivery location 214a associated with the user profile 222.

According to one embodiment, when the courier device 238 is used to scan the package identifier, the delivery verification program 110a, 110b may transmit an alert to the courier device 238 that delivery verification is required using the present networks information. In one embodiment, the courier device 238 may automatically scan for the present network information, as previously described. In some embodiments, the courier agent 216 may interact with the courier device 238 to manually scan for the present network information. In at least one embodiment, the courier device 238 may be enabled to toggle between various communication protocols (e.g., Wi-Fi-, Bluetooth, NFC, RFID) to detect any IoT devices 228n (e.g., via device name 230) broadcasting a signal in proximity of the delivery location 214a.

According to one embodiment, once the courier device 238 detects the wireless network name 224a, the courier device 238 may determine whether the signal strength 224b at the location of the courier device 238 matches the expected signal strength 224b. If the signal strength 224b at the location of the courier device 238 does not match the expected signal strength 224b, the delivery verification program 110a, 110b may provide directions for navigating from the location of the courier device 238 to the delivery location 214a where the detected signal strength 224b matches the expected signal strength 224b. In one embodiment, the delivery verification program 110a, 110b may use the signal strength 224b to enable fine grained delivery placement. This may be relevant in an apartment building use case where the wireless network name 224a may be detectable from various floors of the apartment building but the detected signal strength 224b may match the expected signal strength 224b on the correct floor of the delivery location 214a. Fine grained delivery placement may also be relevant in use cases where the delivery location 214a may include a specific drop-off location, e.g., drop-off location at a back door of a house indicated by the expected signal strength 224b.

According to one embodiment, once the wireless network name 224a is found and the signal strength 224b is matched, the delivery verification program 110a, 110b may transmit an alert to the courier device 238 indicating that the courier agent 216 is approved to leave the package at the current location. In some embodiments, environment 200 may implement a blockchain (e.g., trusted immutable data store) and the delivery verification program 110a, 110b may enable the courier device 238 to save the delivery confirmation using a blockchain proof. In one embodiment, the courier device 238 may write the captured network information to the blockchain, such that the network information is securely accessible by other parties. In other embodiments, if a password associated with the wireless network name 224a is provided in the user profile 222, the delivery verification program 110a, 110b may attempt to connect the courier device 238 to the wireless network using the password, in order to verify that the wireless network is correct. If the courier device 238 is able to connect to the wireless network, the delivery verification program 110a, 110b may store a digital trail of the connection as confirmation of presence at the accurate delivery location 214a.

According to one embodiment, if present network information (e.g., wireless network name 224a, the signal strength 224b, and the device names 230 of any IoT devices 228n) does not match the expected network information, the delivery verification program 110a, 110b may transmit a prompt to the courier agent 216 (e.g., via courier device 238) to manually validate that the location of the courier device 238 is the delivery location 214a. In one embodiment, the courier agent 216 may double verify the delivery location 214a using the physical address 214b and find that the present network information captured by the courier device 238 still does not match the expected network information from the user profile 222. In such embodiments, the delivery verification program 110a, 110b may receive feedback from the courier device 238 including the alternative present network information found at the delivery location 214a. In one embodiment, the delivery verification program 110a, 110b may utilize the feedback from the courier device 238 to update the user profile 222 with the alternative present network information over time. In other words, the delivery coordination service 202 may be resilient to changes in the present network information (e.g., renamed wireless network) found at the delivery location 214a. The delivery verification program 110a, 110b may constantly learn from the feedback received from the courier device and modify the network information in the user profile 222. Once the user profile 222 is modified with the learned network information from the courier device 238, the delivery verification program 110a, 110b may eliminate the prompt or warning regarding the mismatch between the expected network information and the present network information at the delivery location 214a.

According to one embodiment, the user profile 222 may not be initially populated with one or more of the network information (e.g., the wireless network name 224a, the signal strength 224b, and the device names 230 of any IoT devices 228n at the delivery location 214a). In such embodiments, the delivery coordination service 202 may initially learn the network information associated with the user profile 222 based on the captured present network information from the courier device 238 at the delivery location 214a at the delivery time. In one embodiment, user 212 may only provide the wireless network name 224a as part of the user profile 222. Accordingly, the delivery verification program 110a, 110b may only transmit the wireless network name 224a as the expected network information to the courier device 238 during delivery. In at least one embodiment, at the delivery location 214a, the courier device 238 may capture the signal strength 224b of the wireless network associated with the wireless network name 224a, which may be previously unknown to the delivery verification program 110a, 110b. In one embodiment, the delivery verification program 110a, 110b may write the signal strength 224b associated with the wireless network name 224a in the user profile 222, as part of an initial learning phase. In one embodiment, the user profile 222 may not include network information associated with any IoT devices 228n running on the home network 226 of the delivery location 214a. In such embodiments, the courier agent 216 may use the courier device 238 to scan for one or more IoT devices 228n within a proximity of the delivery location 214a. In one embodiment, the courier device 238 may search for IoT devices 228n using various communication protocols, such as, Bluetooth, NFC, and RFID. In one embodiment, the courier device 238 may discover device names 230 corresponding to IoT devices 228m, which may have been previously unknown to the delivery verification program 110a, 110b, In such embodiments, the delivery verification program 110a, 110b may write these device names 230 corresponding to IoT devices 228m in the user profile 222, as part of the initial learning phase. In one embodiment, the IoT devices 228n may be used to increase a confidence score associated with a location being the delivery location 214a. The delivery verification program 110a, 110b may use the correlation between the signal strength 224b and the IoT devices 228m to derive further confirmation of the delivery location 214a within a crowded space where many wireless networks may exist simultaneously, and the signal strengths of individual networks may be difficult to identify. In such embodiments, detecting IoT devices 228n (e.g., device name 230 of the IoT device 228n) which may be unique to the physical address 214b may be utilized to secure a higher confidence score ranking for that location as being the delivery location 214a. As previously described, the delivery verification program 110a, 110b may utilize the IoT devices 228n as landmarks unique to the delivery location 214a.

According to one embodiment, the delivery verification program 110a, 110b may automatically generate the user profile 222 for the user 212 during the initial learning phase of the delivery verification program 110a, 110b. In such embodiments, the user 212 may opt-in to the delivery coordination service 202 but may not need to input further network information associated with the delivery location 214a. In such embodiments, the network information (e.g., the wireless network name 224a, the signal strength 224b, and the device names 230 of any IoT devices 228n at the delivery location 214a) may be written to the user profile 222 each time the courier agent 216 delivers a package to the delivery location 214a. In one embodiment, the courier device 238 may automatically capture the present network information at the delivery location 214a when the package identifier is scanned by the courier device 238. In one embodiment, the delivery verification program 110a, 110b may retrieve the captured present network information and store the network information with the user profile 222. Each time the captured present network information matches the network information stored with the user profile 222, the delivery verification program 110a, 110b may increase a confidence score associated with the delivery location 214a.

Figure 3:
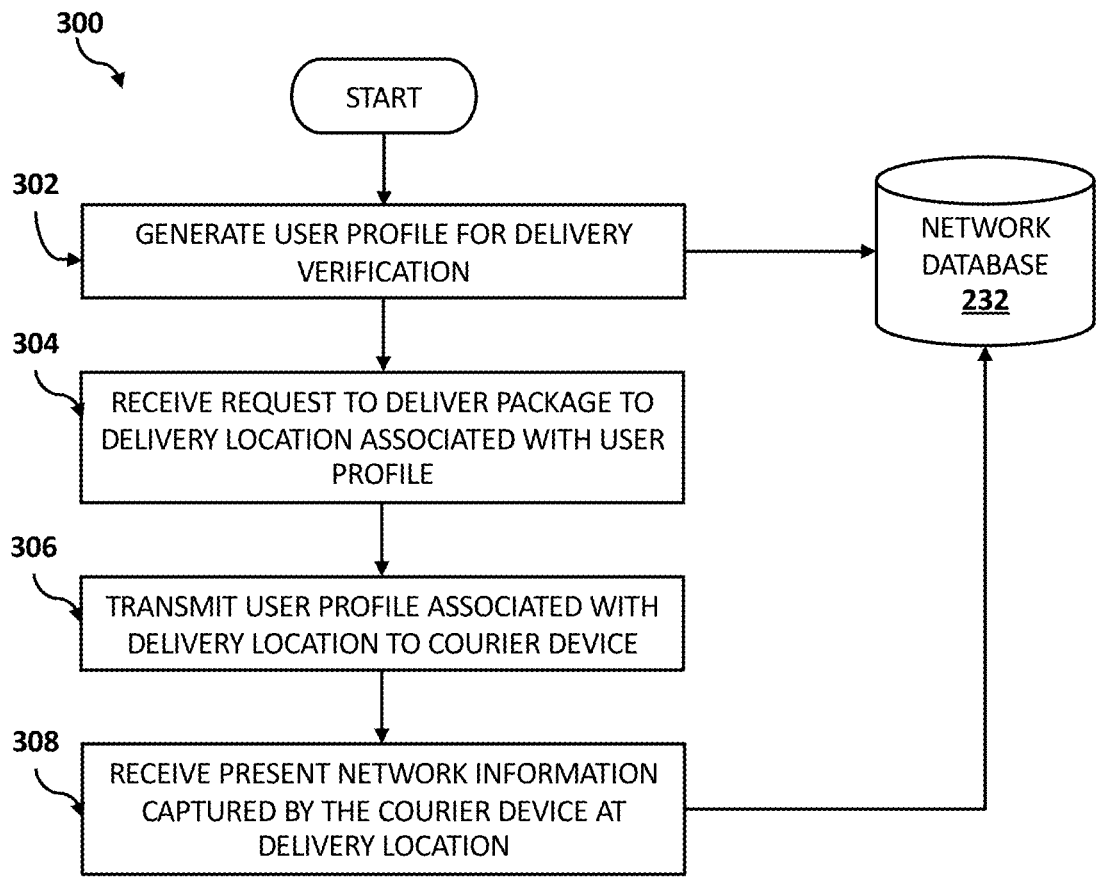
FIG. 3 is an operational flowchart illustrating an exemplary delivery verification learning process according to at least one embodiment.

Referring now to FIG. 3, an operational flowchart illustrating the exemplary delivery verification learning process 300 used by the delivery verification program 110a, 110b according to at least one embodiment is depicted. Process 300 may be described with reference to environment 200 detailed with reference to FIG. 2.

At 302, a user profile is generated for delivery verification. According to one embodiment, a user may opt-in to the proposed solution of the delivery coordination service to enable accurate deliveries to a delivery location associated with the user. As previously described, the delivery verification program 110a, 110b may enable the user to generate a user profile for delivery verification purposes. The delivery verification program 110a, 110b may enable the user to set up the user profile within a user delivery application running on the user device, within a profile setting portal of individual retail services, and/or within a profile settings portal of individual courier services. In generating the user profile, the delivery verification program 110a, 110b may prompt the user to enter a physical address of the delivery location associated with the user. In one embodiment, the delivery verification program 110a, 110b may also prompt the user to enter one or more network information (e.g., a wireless network name, a signal strength of the Wi-Fi signal having the wireless network name at the delivery location, and device names of any IoT devices connected to a home network of the delivery location) associated with the delivery location, as previously described with reference to FIG. 2. In some embodiments, the delivery verification program 110a, 110b may generate the user profile without having the user input the network information associated with the delivery location. In such embodiments, the delivery verification program 110a, 110b may learn the network information associated with the delivery location based on the network information captured by a courier device during delivers over time. In one embodiment, the generated user profile may be stored in network database 232, as described previously.

Then at 304, a request to deliver a package to a delivery location associated with the user profile is received. According to one embodiment, the user may interact with a retail service, e.g., via user device over a communication network, to purchase one or more items. In one embodiment, the retail service may communicate with the delivery coordination service to link the purchased item to the corresponding user profile. In one embodiment, the delivery verification program 110a, 110b may receive a request (e.g., from the retail service or the user device) to deliver a package (e.g., including the purchased item) to the delivery location of the user.

Then at 306, the user profile associated with the delivery location is transmitted to the courier device. According to one embodiment, the delivery verification program 110a, 110b may implement a courier service to execute the delivery of the package (e.g., including the purchased item) to the delivery location of the user. In one embodiment, the courier service may provide a courier device for each courier agent, where the courier device may enable the courier agent to locate and validate the delivery location for a package associated with the user. According to one embodiment, the delivery verification program 110a, 110b may transmit a request to the courier service to deliver a package to the delivery location of the user. In one embodiment, the delivery request may be generated by the courier delivery application in the courier device. In one embodiment, the delivery verification program 110a, 110b may transmit the user profile associated with the delivery request to the courier device.

In one embodiment, the user profile associated with the delivery location may include a first network information for verifying the delivery location. In one embodiment, the first network information may include one or more of the following: an expected wireless network name associated with the delivery location, an expected signal strength of the wireless network at the delivery location, and expected device names of IoT devices at the delivery location. In one embodiment, the user profile associated with the delivery location may include a second network information for verifying the delivery location. In one embodiment, the second network information may include one or more of the following: an expected wireless network name associated with the delivery location, an expected signal strength of the wireless network at the delivery location, and expected device names of IoT devices at the delivery location. In one embodiment, the user profile associated with the delivery location may include a third network information for verifying the delivery location. In one embodiment, the third network information may include one or more of the following: an expected wireless network name associated with the delivery location, an expected signal strength of the wireless network at the delivery location, and expected device names of IoT devices at the delivery location.

In one embodiment, the user profile may include the first network information, the second network information, and the third network information for verifying the delivery location. In some embodiments, the user profile may only include the first network information, and the delivery verification program 110a, 110b may learn the second network information and the third network information based on the courier device capturing the second network information and the third network information at the delivery location. In other embodiments, the user profile may include the first network information and the second network information, and the delivery verification program 110a, 110b may learn the third network information based on the courier device capturing the third network information at the delivery location. In yet other embodiments, the user profile transmitted to the courier device may only indicate a physical address of the delivery location, and the delivery verification program 110a, 110b may learn the first network information, the second network information, and the third network information based on the courier device capturing the respective network information at the delivery location.

Then at 308, present network information captured by the courier device at the delivery location is received. According to one embodiment, when the courier agent arrives in a vicinity of the delivery location, the courier agent may interact with the courier device to scan a package identifier of the package to be delivered. Responsive to scanning the package identifier, the courier device may automatically capture one or more of the first network information, the second network information, and the third network information for verifying the delivery location, as described above.

In one embodiment, the courier device may automatically capture one or more of the following: the wireless network name of a Wi-Fi signal at the delivery location, the signal strength of the Wi-Fi signal, and the device names of any IoT devices at the delivery location. In some embodiments, the courier agent may interact with the courier device to manually scan for the present network information. In at least one embodiment, the courier device may be enabled to toggle between various communication protocols (e.g., Wi-Fi-, Bluetooth, NFC, RFID) to detect any IoT devices (e.g., via device name 230) broadcasting a signal in proximity of the delivery location. According to one embodiment, the delivery verification program 110a, 110b may retrieve the present network information from the courier device and store the present network information in the network database 232.

In one embodiment, the present network information may be used to populate the network information associated with the user profile, if only some information or no information is provided by the user during profile set up. For example, the user profile may include a first network information (e.g., wireless network name) for verifying the delivery location. In such embodiments, the delivery verification program 110a, 110b may implement the courier device to detect the first network information (e.g., wireless network name) at the delivery location. In such embodiments, the delivery verification program 110a, 110b may also receive a second network information (e.g., signal strength) captured by the courier device at the delivery location. In some embodiments, the delivery verification program 110a, 110b may learn the received second network information for verifying the delivery location and store the learned second network information is stored with the user profile. In at least one embodiment, the delivery verification program 110a, 110b may also receive a third network information (e.g., device name of IoT device at delivery location) captured by the courier device at the delivery location. It is contemplated that the third network information (e.g., device name of IoT device) may be unique to each delivery location. In some embodiments, the delivery verification program 110a, 110b may learn the received third network information for verifying the delivery location and store the learned third network information with the user profile.

In some embodiments, the present network information captured by the courier device over time may be used to increase a confidence score associated with the delivery location. Once the delivery verification program 110a, 110b is confident with reference to the accuracy of the network information associated with the delivery location, the delivery verification program 110a, 110b may be deployed according to the process described below with reference to FIG. 4.

Figure 4:
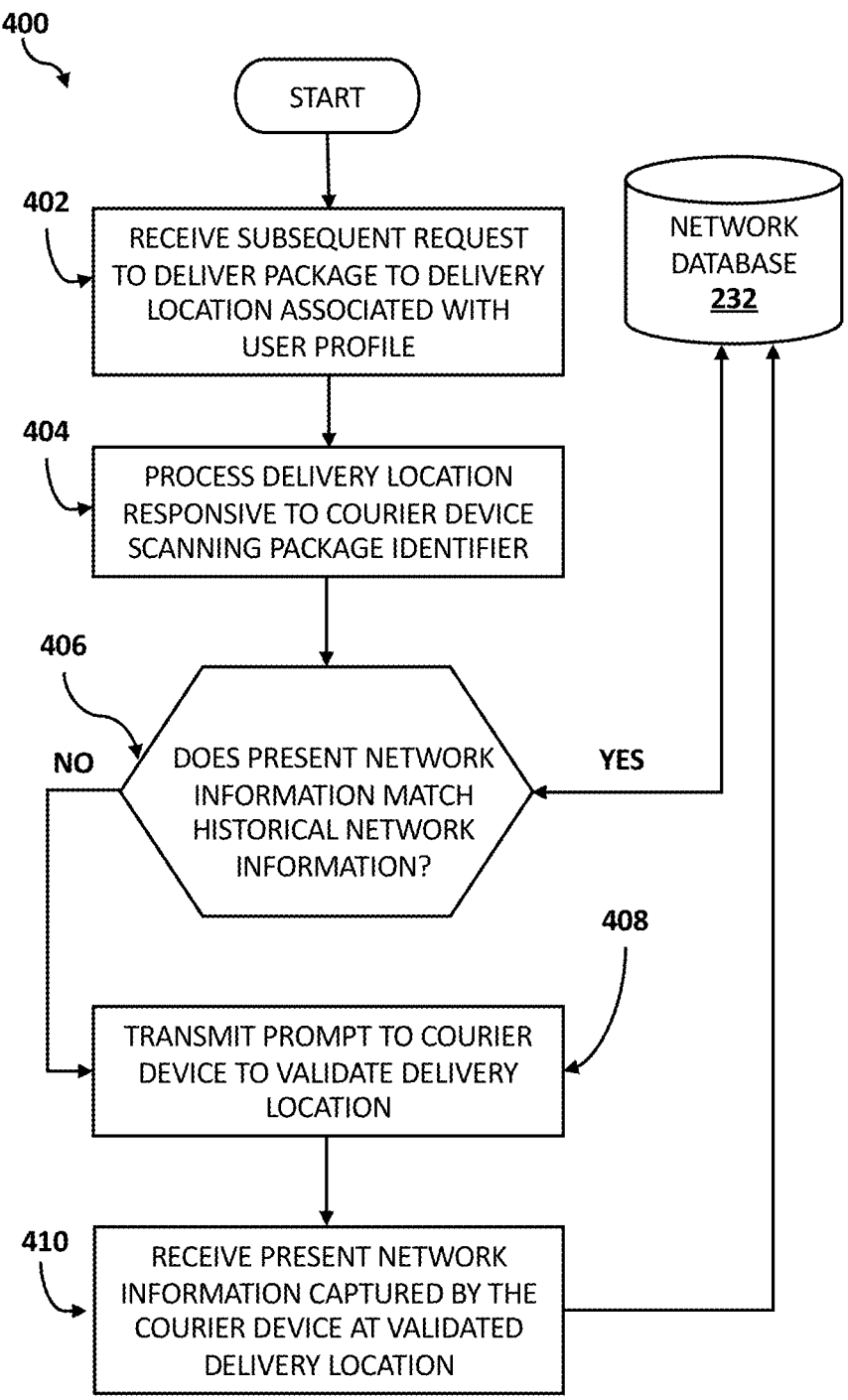
FIG. 4 is an operational flowchart illustrating an exemplary delivery verification deployment process according to at least one embodiment.

Referring now to FIG. 4, an operational flowchart illustrating the exemplary delivery verification deployment process 400 used by the delivery verification program 110a, 110b according to at least one embodiment is depicted. Process 400 may be described with reference to environment 200 detailed with reference to FIG. 2 and process 300 detailed with reference to FIG. 3.

At 402, a subsequent request to deliver a package to the delivery location associated with the user profile is received. According to one embodiment, subsequent requests for delivery received by the delivery verification program 110a, 110b may be analogous to process 306 described with reference to FIG. 3. In one embodiment, the delivery verification program 110a, 110b may receive a request (e.g., from the retail service or the user device) to deliver a package (e.g., including the purchased item) to the delivery location of the user.

Then at 404, a delivery location is processed in response to a courier device scanning a package identifier of a package for delivery. As described previously, when the courier agent arrives in a vicinity of the delivery location, the courier agent may interact with the courier device to scan a package identifier of the package to be delivered. Responsive to scanning the package identifier, the courier device may capture one or more present network information which was detectable in proximity of the delivery location at a delivery time. In one embodiment, the courier device may capture one or more of the following: the wireless network name of a Wi-Fi signal at the delivery location, the signal strength of the Wi-Fi signal, and the device names of any IoT devices at the delivery location. According to one embodiment, the delivery verification program 110a, 110b may retrieve the captured present network information from the courier device and store the present network information in the network database 232.

Thereafter, at 406, the delivery verification program 110a, 110b determines whether the present network information is a match with historical network information. According to one embodiment, the delivery verification program 110a, 110b may compare the network information stored with the user profile (historical network information/expected network information) in the network database 232 with the present network information captured by the courier device to generate an assessment of whether a location of the courier agent/courier device matches the delivery location associated with the user profile. If the delivery verification program 110a, 110b determines that the wireless network name detected by the courier device matches the expected wireless network name, then at 406 ("Yes" branch), the delivery verification program 110a, 110b stores a confirmation of the wireless network name in the network database 232. Once the courier device detects the wireless network name, the delivery verification program 110a, 110b may determine whether the signal strength detected by the courier device at the location of the courier device matches the expected signal strength. According to one embodiment, once the wireless network name and the signal strength are matched with the expected wireless network name and signal strength, the delivery verification program 110a, 110b may transmit an alert to the courier device indicating that the courier agent is approved to leave the package at the current location.

However, if at 406, the delivery verification program 110a, 110b determines that the present network information (e.g., wireless network name, the signal strength, and/or the device names of any IoT devices) does not match the expected/historical network information, then at 408 ("No" branch), the delivery verification program 110a, 110b transmits a prompt to the courier device to validate the delivery location. In one embodiment, if the wireless network name detected by the courier device matches the expected wireless network name, but the signal strength at the location of the courier device does not match the expected signal strength, the delivery verification program 110a, 110b may provide directions for navigating from the location of the courier device to the delivery location where the detected signal strength matches the expected signal strength. In one embodiment, the courier agent may double verify the delivery location using the physical address.

Then at 410, the present network information captured by the courier device at a validated delivery location is received. According to one embodiment, responsive to detecting a change in the wireless network name associated with the delivery location, the delivery verification program 110a, 110b may transmit a prompt to the courier device to instruct manual validation of the delivery location by the courier agent. In one embodiment, the courier agent may manually validate the delivery location by double checking the physical address against the location of the courier agent. In one embodiment, the courier agent may interact with the courier device to indicate that the delivery location has been validated manually. According to one embodiment, in response to receiving a threshold number of manual validations of the delivery location by the courier agent, the delivery verification program 110a, 110b may learn the detected change in the wireless network name associated with the delivery location. In at least one embodiment, the threshold number associated with the manual validations may be determined by the delivery verification program 110a, 110b based on a confidence threshold (e.g., 90% confidence threshold).

In one embodiment, the delivery verification program 110a, 110b may store a modified wireless network name with the user profile. In one embodiment, the modified wireless network name may include the learned change in the wireless network name associated with the delivery location. Thereafter, in response to a subsequent detection of the modified wireless network name by the courier device at the delivery location, the delivery verification program 110a, 110b may transmit a confirmation to the courier device indicating a match between the modified wireless network name detected by the courier device and the user profile.

For example, the delivery verification program 110a, 110b may have expected to detect the wireless network name: "SilversteinNetwork" at the delivery location. However, the present wireless network name detected by courier device at the delivery location may be "SilverteinNet." Once the courier device manually validates the accuracy of the delivery location a threshold number of times, the delivery verification program 110a, 110b may store the alternative present wireless network name in the network database 232. Over time, the delivery verification program 110a, 110b may learn the alternative present wireless network name (e.g., "SilverteinNet") as the expected wireless network name.

Figure 5:
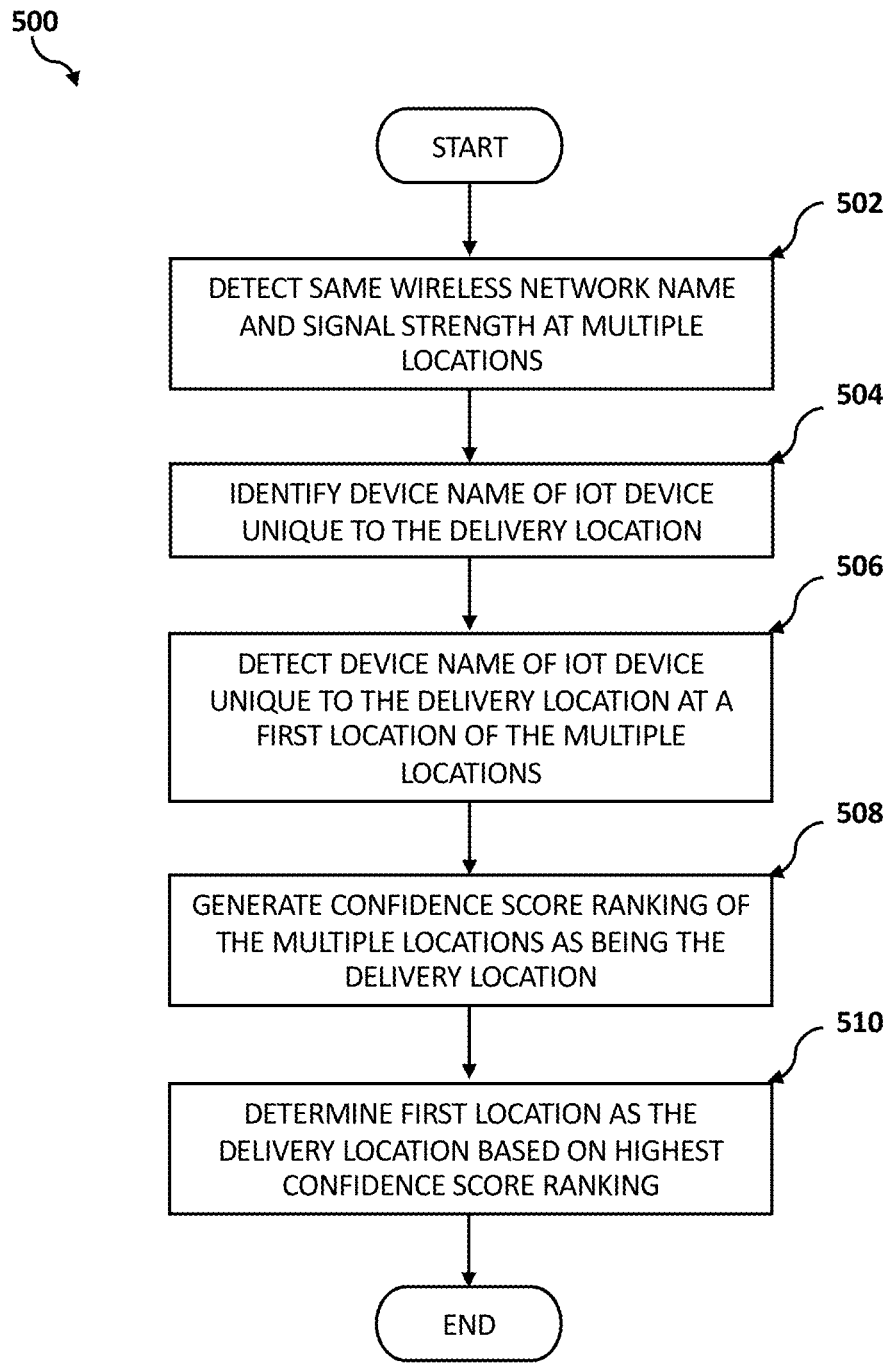
FIG. 5 is an operational flowchart illustrating an exemplary delivery verification confidence scoring process according to at least one embodiment.

Referring now to FIG. 5, an operational flowchart illustrating the exemplary delivery verification confidence scoring process 500 used by the delivery verification program 110a, 110b according to at least one embodiment is depicted. Process 500 may be described with reference to environment 200 detailed with reference to FIG. 2, process 300 detailed with reference to FIG. 3, and process 400 detailed with reference to FIG. 4.

At 502, a same wireless network name and signal strength is detected at multiple locations. According to one embodiment, the delivery verification program 110a, 110b may be implemented to find a delivery location in proximity of multiple other locations. In one example, the delivery location may be one apartment in a floor having 30 apartment units. The delivery verification program 110a, 110b may implement the courier device to scan for network information associated with the delivery location. In one embodiment, the user profile associated with the delivery location may indicate an expected wireless network name (e.g., first network information) and an expected signal strength (e.g., second network information). However, the courier device may detect the same expected wireless network name and the same expected signal strength at multiple locations within a proximity of the delivery location.

Then at 504, a device name of an IoT device unique to the delivery location is identified. According to one embodiment, the user profile associated with the delivery location may indicate one or more expected device names corresponding to IoT devices (e.g., third network information) that may be unique to the delivery location. In some embodiments, the delivery verification program 110a, 110b may have learned the expected device names corresponding to IoT devices associated with the delivery location during the initial learning process (e.g., process 300). In one embodiment, the delivery verification program 110a, 110b may identify device names corresponding to IoT devices stored in the network database and instruct the courier device to scan for the device names.

Then at 506, the device name of the IoT device unique to the delivery location is detected at a first location of the multiple locations. The delivery verification program 110a, 110b may implement the courier device to detect the device name of the IoT device, as previously described. In one embodiment, the courier device may be enabled to toggle between various communication protocols (e.g., Wi-Fi-, Bluetooth, NFC, RFID) to detect any IoT devices near the delivery location.

Then at 508, a confidence score ranking of the multiple locations as being the delivery location is generated. According to one embodiment, the delivery verification program 110a, 110b may calculate a confidence score for each of the multiple locations based on detecting the first network information (e.g., wireless network name) and the second network information (e.g., signal strength). However, since the delivery verification program 110a, 110b also detected the third network information (e.g., device names corresponding to IoT devices) at the first location of the multiple locations, the delivery verification program 110a, 110b may increase the confidence score associated with the first location. In one embodiment, the delivery verification program 110a, 110b may rank the confidence scores and the first location may be found to include the highest confidence score ranking relative to the multiple locations based on the detected third network information.

Next at 510, the first location is determined to be the delivery location based on the highest confidence score ranking. According to one embodiment, the delivery location program 110a, 110b may determine that the first location includes the delivery location based on having the highest confidence score ranking. In one embodiment, the first location may include the expected wireless network name, the expected signal strength, and the device names corresponding to IoT devices. Based on the correlation between the detected IoT devices at the first location and the signal strength, the delivery verification program 110a, 110b may derive further confirmation that the first location is the delivery location.

Figure 6:
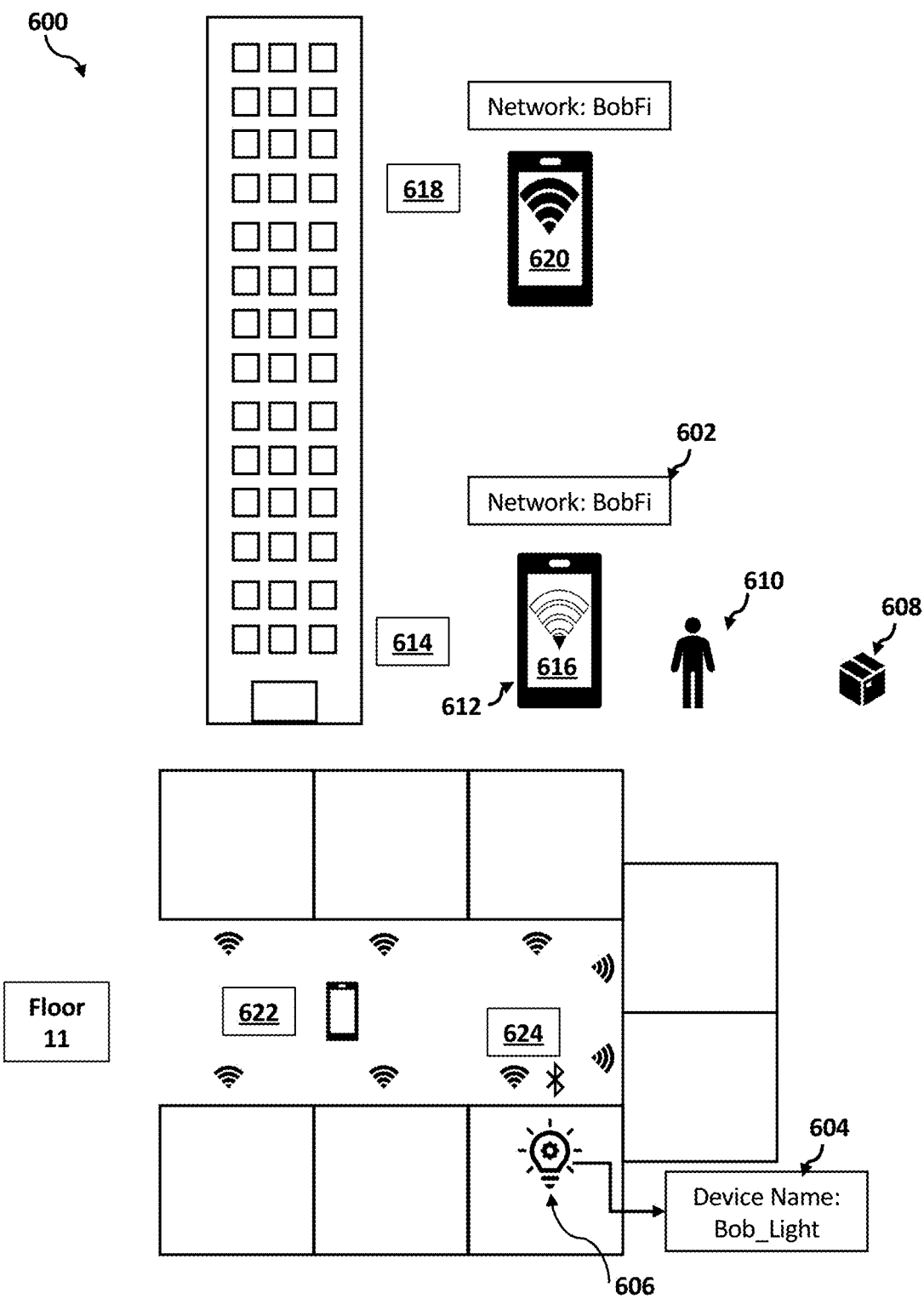
FIG. 6 is a block diagram illustrating an exemplary delivery process used by the delivery verification program 110a, 110b according to at least one embodiment.

Referring now to FIG. 6, a block diagram illustrating an exemplary delivery process 600 used by the delivery verification program 110a, 110b according to at least one embodiment is depicted.

Bob lives in a large apartment building and his packages are always being dropped off at his neighbor's unit 1C instead of his unit 11C. Bob may opt-in to the proposed wireless network verification for his next delivery. The delivery verification program 110a, 110b may enable Bob to set up a user profile. When setting up the user profile, Bob may enter the physical address for the delivery location (e.g., his apartment), a wireless network name 602 ("BobFi") associated with the Wi-Fi signal running on his home network, and a device name 604 ("Bob_Light") of an IoT smart lightbulb 606 running on his home network at the delivery location.

A package 608 for Bob is out for delivery. A courier agent 610 may arrive at Bob's apartment building and may go to the first floor to deliver the package 608 at unit 1C. The courier agent 610 may interact with a courier device 612 to mark the package 608 as delivered at event 614. In response to the courier agent 610 scanning the package 608 using the courier device 612, the delivery verification program 110a, 110b may recognize that Bob has turned on Wi-Fi verification. The delivery verification program 110a, 110b may implement the courier device 612 to scan for available Wi-Fi networks in the apartment building. The courier device 612 may detect the wireless network name 602 ("BobFi") associated with Bob's network. However, at event 614, the courier agent 610 may determine that the signal strength detected by the courier device 612 is a weak signal strength 616 of Bob's network.

The delivery verification program 110a, 110b may transmit a prompt to the courier device 612 to recheck the address of the delivery location. The courier agent 610 may check the physical address on package 608 and may determine that he is on the wrong floor—Bob's apartment is unit 11C, not unit 1C. The delivery verification program 110a, 110b may also transmit a navigation direction to the courier device 612 to instruct the courier agent 610 to keep moving upwards in the apartment building. The courier agent 610 may take the stairs, and with each higher floor, the courier device 612 may detect a stronger signal strength of Bob's network. At event 618, on the 11$^{th}$ floor, the courier device 612 may detect a strong signal strength 620 of wireless network name 602 ("BobFi") associated with Bob's network.

At event 622, the courier agent 610 may walk through a U-shaped hallway with eight apartment units. In the middle of the hallway, the courier device 612 may detect the strong signal strength 620 of wireless network name 602 ("BobFi") from each of the apartments on the 11$^{th}$ floor. The delivery verification program 110a, 110b may recognize that the delivery location may not be determined using only the wireless network name and the signal strength. Accordingly, the delivery verification program 110a, 110b may instruct the courier device 612 to scan for an IoT device which may be unique to Bob's apartment. When setting up the user profile, Bob indicated the inclusion of IoT smart lightbulb 606 with device name 604 ("Bob_Light") running on his home network. The delivery verification program 110a, 110b may transmit this expected network information to the courier device 612. The courier device 612 may implement various communication protocols when scanning for the IoT device unique to Bob's apartment. At event 624, the courier device 612 may use Bluetooth to detect the device name 604 ("Bob-Light") of the IoT smart lightbulb 606. The location of event 624, where the device name 604 was detected by the courier device 612, may be provided with the highest confidence score ranking out of the eight apartments on the 11$^{th}$ floor. The delivery verification program 110a, 110b may determine that the location of event 624 is Bob's apartment unit 11C based on having the highest confidence score ranking on the 11$^{th}$ floor. Accordingly, the delivery verification program 110a, 110b may instruct the courier agent 610 to deliver the package 608 at the location of event 624.

The functionality of a computer may be improved by the delivery verification program 110a, 110b because the delivery verification program 110a, 110b may enable a computer to identify a location based on detecting a wireless network and one or more IoT devices running in the location. In one embodiment, the delivery verification program 110a, 110b may enable the computer to constantly learn and modify itself, such that the computer is resilient to changes in the wireless network over time.

It may be appreciated that FIGS. 2 to 6 provide only an illustration of one embodiment and do not imply any limitations with regard to how different embodiments may be implemented. Many modifications to the depicted embodiment(s) may be made based on design and implementation requirements.

Figure 7:
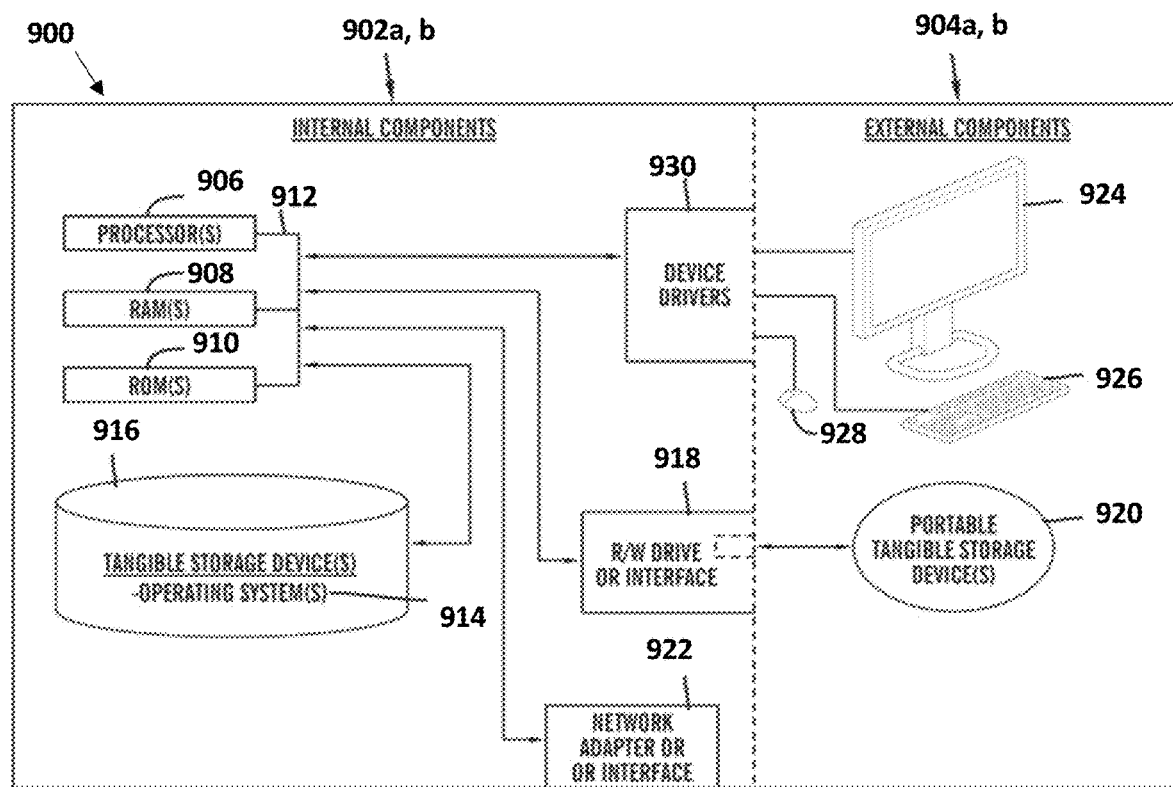
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904 a, b illustrated in FIG. 7. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the delivery verification program 110a in client computer 102, and the delivery verification program 110b in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the delivery verification program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the delivery verification program 110a in client computer 102 and the delivery verification program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the delivery verification program 110a in client computer 102 and the delivery verification program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
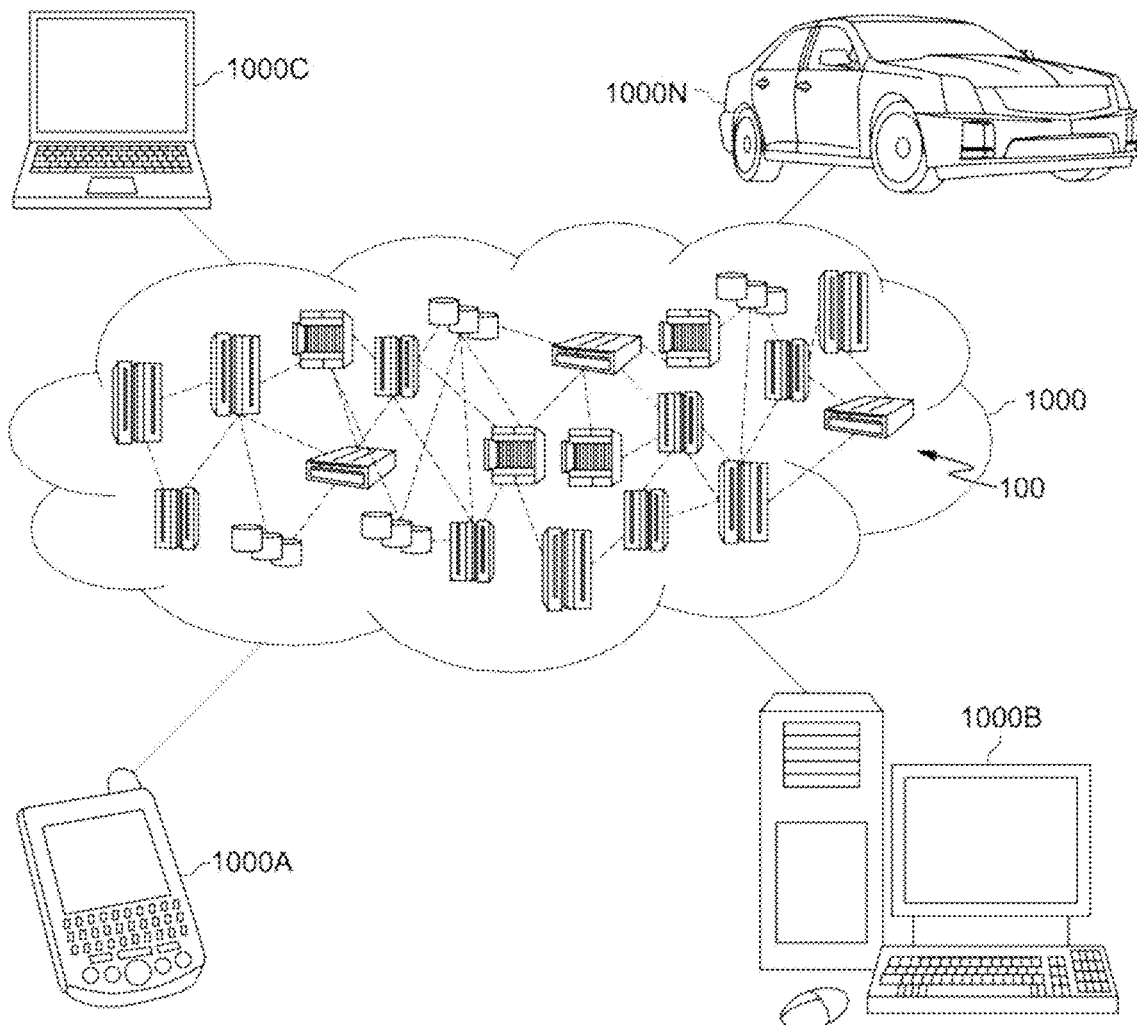
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
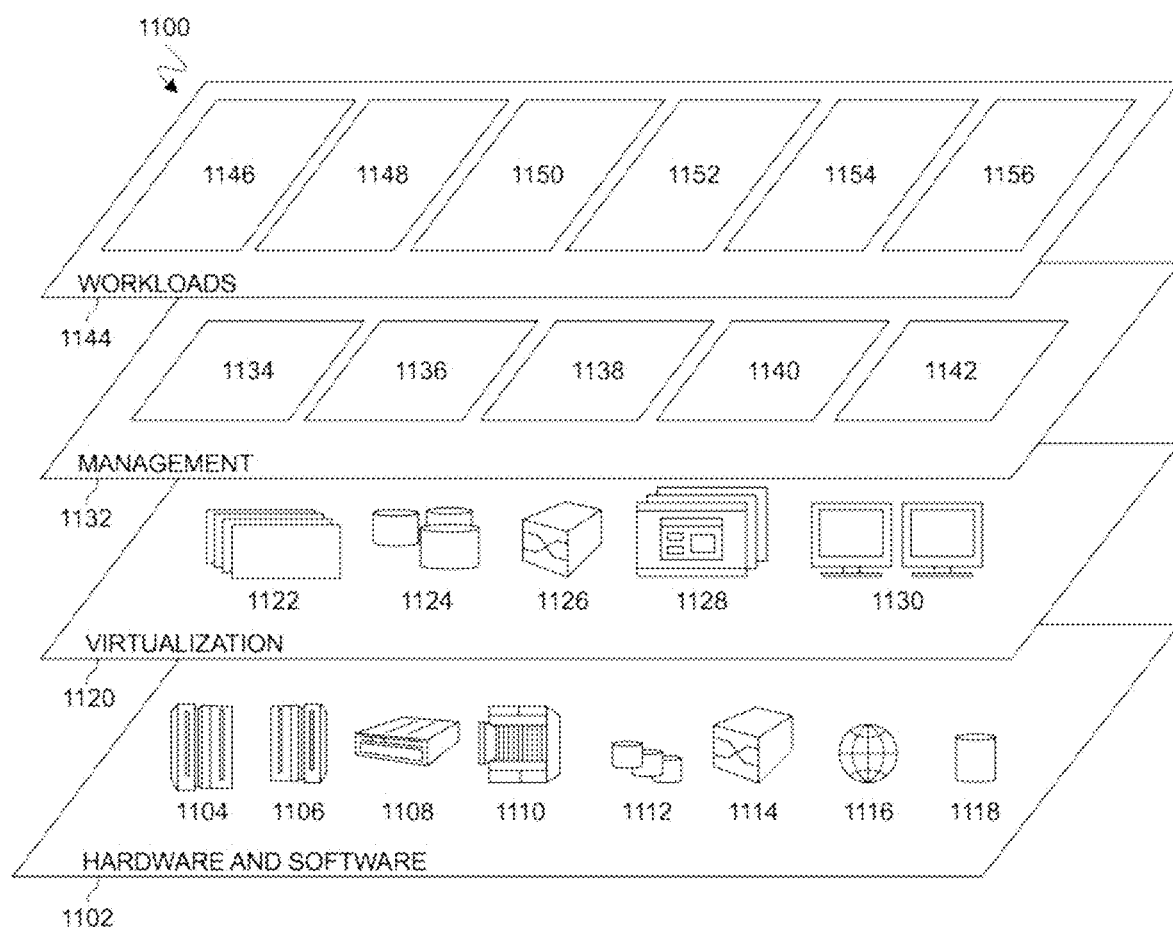
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and delivery verification 1156. A delivery verification program 110a, 110b provides a way to validate a delivery location by detecting one or more network information and IoT devices associated with the delivery location.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving a request to deliver a package to a delivery location associated with a user profile, wherein the user profile includes a first network information for verifying the delivery location, wherein the first network information includes a wireless network name associated with a wireless network running at the delivery location;

transmitting the user profile associated with the delivery location to a courier device, wherein the courier device is associated with a courier agent delivering the package to the delivery location;

in response to detecting, using the courier device, the first network information at the delivery location, determining the first location as the delivery location associated with the user profile;

in response to detecting a change in the wireless network name associated with the delivery location, transmitting a prompt to the courier device to instruct manual validation of the delivery location by the courier agent;

in response to receiving a threshold number of manual validations of the delivery location by the courier agent, learning the detected change in the wireless network name associated with the delivery location; and storing a modified wireless network name with the user profile, wherein the modified wireless network name comprises the learned change in the wireless network name associated with the delivery location.

2. The method of claim 1, further comprising:

receiving a second network information captured by the courier device at the delivery location;

learning the received second network information for verifying the delivery location, wherein the learned second network information is stored with the user profile;

in response to detecting, using the courier device, the first network information and the learned second network information at a plurality of locations within proximity of the delivery location;

identifying a third network information that is unique to the delivery location;

detecting, using the courier device, the identified third network information at a first location of the plurality of locations;

generating a confidence score ranking of the plurality of locations as being the delivery location, wherein the first location includes a highest confidence score ranking relative to the plurality of locations based on the detected third network information; and in response to the first location having the highest confidence score ranking, determining the first location as the delivery location associated with the user profile.

3. The method of claim 1, further comprising:

receiving a third network information captured by the courier device at the delivery location; and learning the received third network information for verifying the delivery location, wherein the learned third network information is unique to the delivery location and wherein the learned third network information is stored with the user profile.

4. The method of claim 1, wherein the learned second network information comprises a signal strength of a wireless network running at the delivery location.

5. The method of claim 2, wherein the identified third network information comprises a device name of an Internet of Things (IoT) device running at the delivery location.

6. The method of claim 1, further comprising:
in response to a subsequent detection of the modified wireless network name by the courier device at the delivery location, transmitting a confirmation to the courier device indicating a match between the modified wireless network name detected by the courier device and the user profile.

7. A computer system for delivery verification, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
receiving a request to deliver a package to a delivery location associated with a user profile, wherein the user profile includes a first network information for verifying the delivery location, wherein the first network information includes a wireless network name associated with a wireless network running at the delivery location;
transmitting the user profile associated with the delivery location to a courier device, wherein the courier device is associated with a courier agent delivering the package to the delivery location;
in response to detecting, using the courier device, the first network information at the delivery location, determining the first location as the delivery location associated with the user profile;
in response to detecting a change in the wireless network name associated with the delivery location, transmitting a prompt to the courier device to instruct manual validation of the delivery location by the courier agent;
in response to receiving a threshold number of manual validations of the delivery location by the courier agent, learning the detected change in the wireless network name associated with the delivery location; and
storing a modified wireless network name with the user profile, wherein the modified wireless network name comprises the learned change in the wireless network name associated with the delivery location.

8. The computer system of claim 7, further comprising:
receiving a second network information captured by the courier device at the delivery location;
learning the received second network information for verifying the delivery location, wherein the learned second network information is stored with the user profile;
in response to detecting, using the courier device, the first network information and the learned second network information at a plurality of locations within proximity of the delivery location;
identifying a third network information that is unique to the delivery location;
detecting, using the courier device, the identified third network information at a first location of the plurality of locations;
generating a confidence score ranking of the plurality of locations as being the delivery location, wherein the first location includes a highest confidence score ranking relative to the plurality of locations based on the detected third network information; and
in response to the first location having the highest confidence score ranking, determining the first location as the delivery location associated with the user profile.

9. The computer system of claim 7, further comprising:
receiving a third network information captured by the courier device at the delivery location; and
learning the received third network information for verifying the delivery location, wherein the learned third network information is unique to the delivery location and wherein the learned third network information is stored with the user profile.

10. The computer system of claim 7, wherein the learned second network information comprises a signal strength of a wireless network running at the delivery location.

11. The computer system of claim 8, wherein the identified third network information comprises a device name of an Internet of Things (IoT) device running at the delivery location.

12. The computer system of claim 7, further comprising:
in response to a subsequent detection of the modified wireless network name by the courier device at the delivery location, transmitting a confirmation to the courier device indicating a match between the modified wireless network name detected by the courier device and the user profile.

13. A computer program product for delivery verification, comprising:
one or more computer-readable storage media and program instructions collectively stored on the one or more computer-readable storage media, the program instructions executable by a processor to cause the processor to perform a method comprising:
receiving a request to deliver a package to a delivery location associated with a user profile, wherein the user profile includes a first network information for verifying the delivery location, wherein the first network information includes a wireless network name associated with a wireless network running at the delivery location;
transmitting the user profile associated with the delivery location to a courier device, wherein the courier device is associated with a courier agent delivering the package to the delivery location;
in response to detecting, using the courier device, the first network information at the delivery location, determining the first location as the delivery location associated with the user profile;
in response to detecting a change in the wireless network name associated with the delivery location, transmitting a prompt to the courier device to instruct manual validation of the delivery location by the courier agent;
in response to receiving a threshold number of manual validations of the delivery location by the courier agent, learning the detected change in the wireless network name associated with the delivery location; and
storing a modified wireless network name with the user profile, wherein the modified wireless network name comprises the learned change in the wireless network name associated with the delivery location.

14. The computer program product of claim 13, further comprising:
receiving a second network information captured by the courier device at the delivery location;

learning the received second network information for verifying the delivery location, wherein the learned second network information is stored with the user profile;

in response to detecting, using the courier device, the first network information and the learned second network information at a plurality of locations within proximity of the delivery location;

identifying a third network information that is unique to the delivery location;

detecting, using the courier device, the identified third network information at a first location of the plurality of locations;

generating a confidence score ranking of the plurality of locations as being the delivery location, wherein the first location includes a highest confidence score ranking relative to the plurality of locations based on the detected third network information; and in response to the first location having the highest confidence score ranking, determining the first location as the delivery location associated with the user profile.

15. The computer program product of claim 13, wherein the first network information comprises a wireless network name associated with a wireless network running at the delivery location.

16. The computer program product of claim 13, wherein the learned second network information comprises a signal strength of a wireless network running at the delivery location.

\* \* \* \* \*